(12) United States Patent
Huffman et al.

(10) Patent No.: US 12,498,251 B2
(45) Date of Patent: Dec. 16, 2025

(54) METHOD, APPARATUS, AND SYSTEM FOR GENERATING SYNTHETIC GROUND TRUTH DRIVE AND SENSOR OBSERVATION DATA

(71) Applicant: HERE Global B.V., Eindhoven (NL)

(72) Inventors: Landis Huffman, Chicago, IL (US); Nilesh Kadam, Mumbai (IN); Dennis Scott Williamson, Wheaton, IL (US); Roberto Raggi, Berlin (DE); James D. Lynch, Waterloo, IA (US); Prasad Kavuri, Chicago, IL (US); Shishir B. Saxena, Mumbai (IN); Sanjay Kumar Boddhu, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 303 days.

(21) Appl. No.: 18/133,343

(22) Filed: Apr. 11, 2023

(65) Prior Publication Data
US 2024/0344846 A1   Oct. 17, 2024

(51) Int. Cl.
*G01C 21/00* (2006.01)
(52) U.S. Cl.
CPC .............................. *G01C 21/3844* (2020.08)
(58) Field of Classification Search
CPC .................................................. G01C 21/3844
USPC .................................................................... 701/430
See application file for complete search history.

(56) References Cited

U.S. PATENT DOCUMENTS

| 9,886,857 | B2 | 2/2018 | Linder et al. |
| 10,739,775 | B2 | 8/2020 | Sun et al. |
| 11,526,721 | B1 * | 12/2022 | O'Malley ............... G06F 30/15 |
| 12,246,734 | B1 * | 3/2025 | Jung ................. B60W 50/0205 |
| 2019/0369626 | A1 * | 12/2019 | Lui ....................... G05D 1/0221 |
| 2020/0174490 | A1 | 6/2020 | Ogale et al. |
| 2020/0247402 | A1 * | 8/2020 | Bouton ........... B60W 60/00276 |

(Continued)

FOREIGN PATENT DOCUMENTS

| EP | 3696509 A1 * | 8/2020 | ............. G01C 21/30 |
| WO | 2021168435 A1 | 8/2021 | |

OTHER PUBLICATIONS

D. Sloggett et al., "An Automated Change Detection System," 1994, Publisher: IEEE.*

(Continued)

*Primary Examiner* — Tuan C To
(74) *Attorney, Agent, or Firm* — DITTHAVONG, STEINER & MLOTKOWSKI

(57) ABSTRACT

An approach is provided for generating synthetic ground truth drive and sensor observation data. The approach, for instance, receiving, by a processor, a first input specifying ground truth data indicating one or more ground truth locations of one or more map features. The approach also involves receiving a second input specifying one or more simulation characteristics. The approach further involves generating simulated drive data based on the ground truth data and the one or more simulation characteristics. For example, the simulated drive data includes (a) one or more simulated drive paths within a region of interest encompassing the one or more ground truth locations and (b) one or more simulated sensor observations of the one or more map features. The approach further involves providing the simulated drive data as an output.

20 Claims, 13 Drawing Sheets

(56) References Cited

U.S. PATENT DOCUMENTS

2022/0215141 A1* 7/2022 Gutierrez ................ G06F 17/18
2023/0278582 A1* 9/2023 Zhang ................ B60W 60/0011
　　　　　　　　　　　　　　　　　　　　　　　701/25
2024/0017743 A1* 1/2024 Farid ............... B60W 60/00274

OTHER PUBLICATIONS

Haltakov et al., "Framework for Generation of Synthetic Ground Truth Data for Driver Assistance Applications", Conference paper, Pattern Recognition. GCPR 2013. Lecture Notes in Computer Science, vol. 8142, 10 pages.

* cited by examiner

METHOD, APPARATUS, AND SYSTEM FOR GENERATING SYNTHETIC GROUND TRUTH DRIVE AND SENSOR OBSERVATION DATA

BACKGROUND

Over the past decades, massive increases in the scale and types of annotated data have accelerated advances in all areas of machine learning. This has enabled major advances in many areas of science and technology, as complex models of physical phenomena or user behavior, with millions or perhaps billions of parameters, can be fitted to datasets of increasing size. However, when such physical phenomena or user behavior involves actions or dynamic movements (e.g., in automated map making applications), such annotated or labeled datasets can be scarce or susceptible to error. Accordingly, service providers face significant technical challenges obtaining labeled data (e.g., ground truth) to evaluate automated map making processes.

SOME EXAMPLE EMBODIMENTS

Therefore, there is a need for an approach for generating synthetic ground truth drive and sensor observation data.

According to one embodiment, a method comprises receiving, by a processor, a first input specifying ground truth data indicating one or more ground truth locations of one or more map features. The method also comprises receiving a second input specifying one or more simulation characteristics. The method further comprises generating simulated drive data based on the ground truth data and the one or more simulation characteristics. For example, the simulated drive data includes (a) one or more simulated drive paths within a region of interest encompassing the one or more ground truth locations and (b) one or more simulated sensor observations of the one or more map features. The method further comprises providing the simulated drive data as an output.

According to another embodiment, an apparatus comprises at least one processor, and at least one memory including computer program code for one or more computer programs, the at least one memory and the computer program code configured to, with the at least one processor, cause, at least in part, the apparatus to receive a first input specifying ground truth data indicating one or more ground truth locations of one or more map features. The apparatus is also caused to receive a second input specifying one or more simulation characteristics. The apparatus is further caused to generate simulated drive data based on the ground truth data and the one or more simulation characteristics. For example, the simulated drive data includes (a) one or more simulated drive paths within a region of interest encompassing the one or more ground truth locations and (b) one or more simulated sensor observations of the one or more map features. The apparatus is further caused to provide the simulated drive data as an output.

According to another embodiment, a non-transitory computer-readable storage medium carries one or more sequences of one or more instructions which, when executed by one or more processors, cause, at least in part, an apparatus to receive a first input specifying ground truth data indicating one or more ground truth locations of one or more map features. The apparatus is also caused to receive a second input specifying one or more simulation characteristics. The apparatus is further caused to generate simulated drive data based on the ground truth data and the one or more simulation characteristics. For example, the simulated drive data includes (a) one or more simulated drive paths within a region of interest encompassing the one or more ground truth locations and (b) one or more simulated sensor observations of the one or more map features. The apparatus is further caused to provide the simulated drive data as an output.

According to another embodiment, an apparatus comprises means for receiving, by a processor, a first input specifying ground truth data indicating one or more ground truth locations of one or more map features. The apparatus also comprises means for receiving a second input specifying one or more simulation characteristics. The apparatus further comprises means for generating simulated drive data based on the ground truth data and the one or more simulation characteristics. For example, the simulated drive data includes (a) one or more simulated drive paths within a region of interest encompassing the one or more ground truth locations and (b) one or more simulated sensor observations of the one or more map features. The apparatus further comprises means for providing the simulated drive data as an output.

In addition, for various example embodiments described herein, the following is applicable: a computer program product may be provided. For example, a computer program product comprising instructions which, when the program is executed by a computer, cause the computer to perform any one or any combination of methods (or processes) disclosed.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating synthetic drive and sensor observation data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. In addition, the embodiments described herein are provided by example, and as such, "one embodiment" can also be used synonymously as "one example embodiment." Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Figure 1:
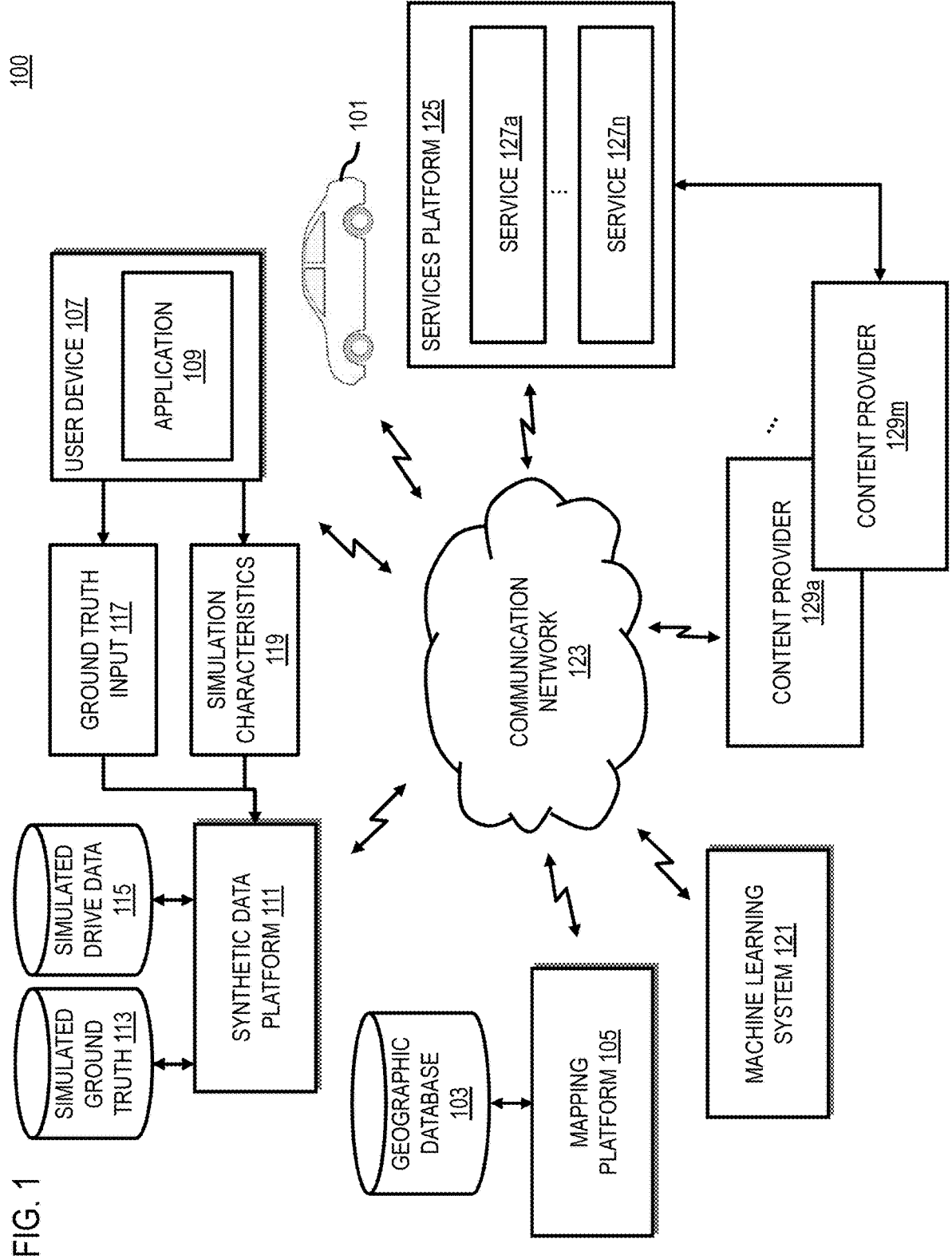
FIG. 1 is a diagram of a system capable of generating synthetic drive and sensor observation data, according to one example embodiment.

FIG. 1 is a diagram of a system 100 capable of generating synthetic drive and sensor observation data, according to one example embodiment. In one embodiment, automated map generation refers to the process of using data collected from probes (e.g., vehicles 101) or sensors (e.g., sensors equipped on the vehicles 101, aerial vehicles, etc.) to create maps (e.g., map data of the geographic database 103 of a mapping platform 105), typically of geographic or spatial information for a region or geographic area of interest. For example, sensor data (e.g., sensor observations of map features—such as but not limited to road boundaries, road signs, objects, etc.) from the vehicles 101 and/or other probe devices (e.g., a user equipment (UE) device 107 executing an application 109) is fed into a mapping algorithm (e.g., executed by the mapping platform 105) that uses the information to construct a representation (e.g., a node-link representation) of the map features (e.g., road networks, road signs, and/or other map features) in the geographic area being surveyed. This can include terrain, elevation, and other physical features/objects, as well as other elements like traffic, air quality, or population density. The use of automated map building algorithms enables fast and efficient mapping of large areas, and the maps generated can be used for a variety of purposes, such as navigation, planning, and analysis.

However, because automated map creation is generally performed without human intervention, map service providers face significant technical challenges with respect to assessing the performance (e.g., accuracy, precision, etc. of mapped features) to ensure high quality map building. In one embodiment, automated map creation can be assessed by comparing estimated positions of map attributes (e.g., signs or other equivalent features) to ground truth positions of those same attributes. Traditionally, ground truth can be found from manual survey of the area of interest to measure true positions and relevant attributions (e.g., dimensions, color, sign type, etc.). Ground truth created manually, however, is susceptible to multiple sources of error which can negatively impact performance metrics produced when comparing estimates to the truth. First, the true location is itself measured, which has inherent position error, and is prone to subjectivity as to what features in the real world are worth measuring (e.g., what does and does not constitute a "road sign"?). Second, there is no known correspondence between observations in real data and the ground truth. All of these factors can erroneously degrade performance metrics when an estimate is compared to the ground truth. It is difficult to separate error due to the map-building process from error inherent to the use of manual ground truth. Furthermore, ground truth is also costly to produce, expires over time, and has limited coverage.

To address these technical challenges, the system 100 of FIG. 1 introduces synthetic data platform 111 a capability to produce simulated ground truth 113 (e.g., ground truth locations and/or attributes of known map features or objects) and simulated drive data 115 which comprises simulated vehicle paths and sensor observations that measure the positions of simulated ground truth objects from the simulated paths in any area of interest. In one embodiment, the user (e.g., via UE 107 and application 109) need only supply the true positions/attributions of map features (e.g., ground truth input 117) in a geographic area or region of interest (ROI), and desired statistical characteristics of the simulation (e.g., simulation characteristics 119). The simulation tool (e.g., the synthetic data platform 111) will then generate the drives (e.g., simulated drive data 115) accordingly.

Figure 2:
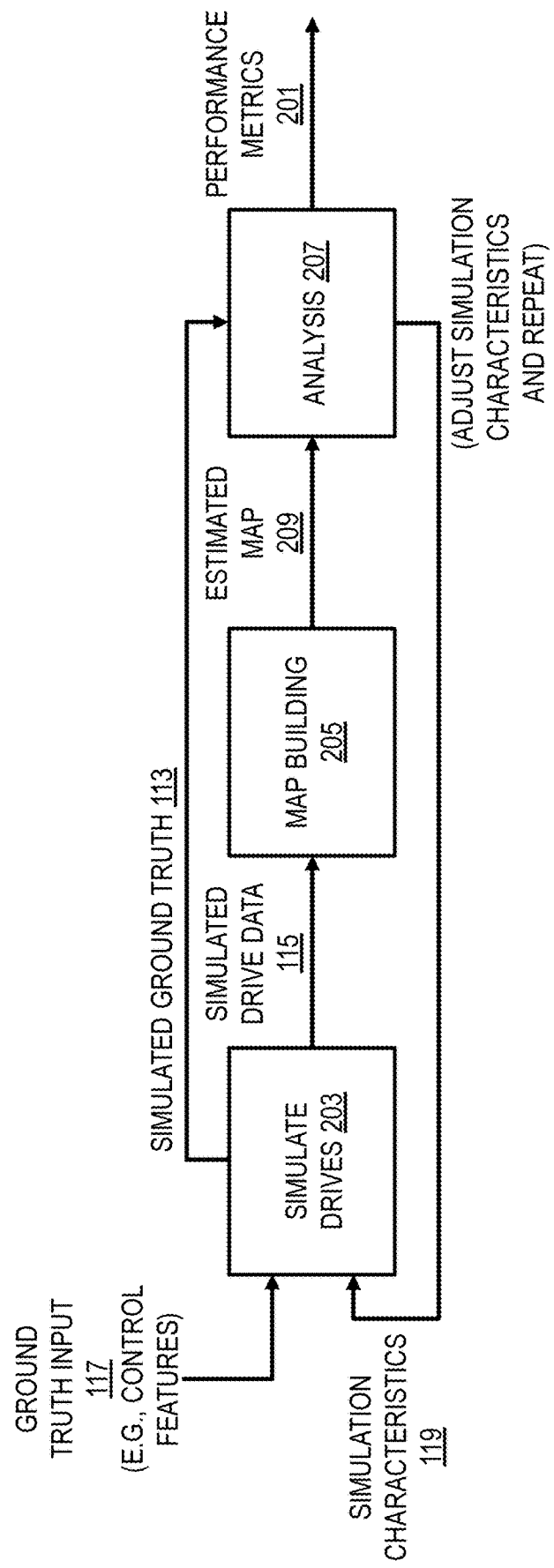
FIG. 2 is a diagram illustrating an example map building performance evaluation pipeline based on simulated drive data, according to one example embodiment.

In one example use case, the various embodiments described herein provide the details for a simulation suite that can be used to generate simulated ground truth data 113 and simulated drive data 115 to test map conflation and estimation pipelines (e.g., evaluate the performance of a map building process). FIG. 2 is a diagram illustrating an example map building performance evaluation pipeline based on simulated drive data, according to one example embodiment. In one embodiment, the system 100 defines simulation system inputs (e.g., ground truth input 117 and simulation characteristics 119) and outputs (e.g., simulated drive data 115 and simulated ground truth data 113), desired performance and methods for evaluation (e.g., performance metrics 201). For example, the ground truth input 117 (e.g., locations of ground truth features or objects representing control features) along with simulation characteristics 119 (e.g., characteristics for generating the simulated drive data 115 including simulated paths and sensor observations described herein-such as but not limited to number of turns in the path, location accuracy, noise, types of sensors, accuracy of sensors, false negative/false positive detection rates, etc.) are fed into a simulate drives process 203 to generate the simulated ground truth 113 (e.g., ground truth locations of control features and optionally their attributes) and the simulated drive data 115 (e.g., simulated vehicle drive paths through the ROI along with simulated sensor observations of the ground truth control features/objects). In one embodiment, the simulate drives process 203 can use a machine learning system 121 (e.g., employing a generative adversarial network (GAN) or equivalent) to generate the simulated drive data 115 and/or simulated ground truth data 113.

The simulated drive data 115 is then fed to the map building process 205 that uses the simulated drive paths and simulated sensor observations to map the locations of map features (e.g., road signs) in the simulated data. The output from the map building process 205 is an estimated map 209 comprising map data indicating the locations of map features/objects from the simulated drive data 115. To assess the performance of the map building process 205, the estimated map 209 and the simulated ground truth data 113 are fed into the analysis process 207. The analysis process 207 compares the estimated map 209 to the simulated ground truth 113 (e.g., by comparing the estimated and true positions of map features in the data) to generate performance metrics 201 (e.g., indicating an accuracy of mapped features/objects in the estimated map with respect to the simulated ground truth data). These performance metrics 201 more accurately represent the performance of the map building process 205 by removing any potential error that may occur from manual ground truth generation. In this way, adjustments can be made to the simulation characteristics 119 and the performance evaluation process repeated to make improvements or learn the characteristics of the map building process 205 or map building algorithm used by the map building process 205.

In comparison, estimated positions traditionally derived from real drive data (as opposed to simulated drive data 115) are evaluated against manually curated "ground truth" to gauge estimation accuracy. However, producing and curating ground truth is expensive, time-consuming, inconsistent, inaccurate, and expires as the world changes with passing time. In contrast, synthetic or simulated ground truth 113 and simulated drive data 115 drives solves each of these problems by generating simulated ground truth 113 and simulated drive data 115 based on an input map (e.g., geographic database 103) and noise characteristics (e.g., simulation characteristics 119). Furthermore, with full control over the synthetic testing environment and introduced drive path and/or sensor errors, specific use cases can be defined and generated to quantify their impact on the map building process 205 (e.g., erroneous lane marking merges, or traffic signal asynchronization).

In one embodiment, the output (e.g., simulated ground truth 113 and/or simulated drive data 115) of the synthetic data platform 111 can be used by the mapping platform 105 for evaluating the performance of the automated map creation processes as described above. In other embodiments, the output can be transmitted over a communication network 123 to other components of the system 100 or with access to the system 100 such as but not limited to a services platform 125, one or more services 127a-127n (also collectively referred to as services 127), one or more content providers 129a-129m (also collectively referred to as content providers 129), and/or the like that can use the output of the system 100 to provide one or more functions, services, applications, etc.

The various embodiments described herein provide for several technical advantages over traditional approaches including but not limited to:

Accuracy—the simulated ground truth 113 is perfectly accurate with respect to the ground locations specified in the ground truth input 117. Accordingly, the various embodiments described herein remove ground truth noise from the simulated ground truth 113 which may otherwise contribute to measured performance and obscure the errors made by map making process.

Longevity—new simulated drive data 115 can be continually regenerated based on the same simulated ground truth data 113 (e.g., the simulated ground truth data 113 remains static and can be used to regenerate any subsequent sets of simulated drive data 115). This avoids having to keep the simulated ground truth data 113 up to date with incoming drive data as traditionally done, which is costly in terms of resources and money.

Coverage—unlimited simulated drive data 115 can be generated in any area covered by the simulated ground truth 113. For example, map service providers may identify new ROIs with interesting characteristics (e.g., number of turn lanes), and the various embodiments described herein can be used to immediately generate data in the area without having to manually survey.

Production Cost—the simulated ground truth 113 can be generated from any source (e.g., any source of ground truth input 117), and then the simulated drive data 115 can be generated on demand. In comparison, manual ground truth costs significantly more time, money, labor, resources, etc. to produce.

Matching Estimated Map to Ground Truth—correspondence between measurement and GT is part of the synthesized output, resulting in more accurate performance metrics. In contrast, after estimating a map on real data, there is an additional estimation step to match the estimates with ground truth data. This process is inherently noisy, which degrades performance metrics, and complicates analysis that attempts to isolate errors made by the map-making process.

Drive Paths are Known—the simulated drive paths used for sensor data observations are known in the various embodiments described herein because they are simulated in comparison to traditional sensor observations where the drive path may be unknown. This is because terrestrial observations record observed features relative to the drive path. Accordingly, when the drive path is unknown, it is difficult to determine how much to attribute errors to poor drive path estimation, or other errors.

Noise is Known—the noise in the simulated drive paths is known in comparison to traditional drive paths where the noise is often not known. When noise is known, it allows for more extensive analysis, where individual aspects of noise can be removed, and impact on accuracy measured.

Captures "Corner or Edge" Cases—some drive situations occur rarely, resulting in sparse or no real-world data. In contrast, the simulation approach of the various embodiments described herein enables very specific problematic corner cases to be simulated and are useful to understand so that their impact on map building can be mitigated.

Figure 3:
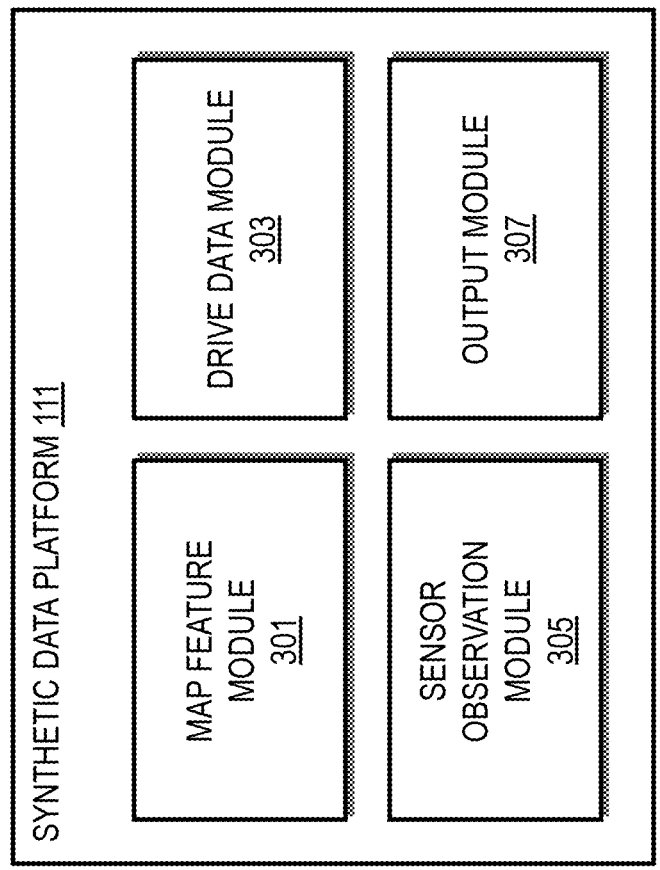
FIG. 3 is a diagram of the components of a synthetic data platform, according to one example embodiment.

In one embodiment, the synthetic data platform 111 performs one or more functions for generating synthetic ground truth and drive data according to various embodiments described herein. FIG. 3 is a diagram of the components of the synthetic data platform 111, according to one example embodiment. By way of example, the synthetic data platform 111 includes one or more components for generating simulated ground truth 113 and simulated drive data 115 according to the various embodiments described herein. It is contemplated that the functions of these components may be combined or performed by other components of equivalent functionality. In this embodiment, the synthetic data platform 111 includes a map feature module 301, a drive data module 303, a sensor observation module 305, and an output module 307. The above presented modules and components of the synthetic data platform 111 can be implemented in hardware, firmware, software, circuitry, or a combination thereof. Though depicted as a separate entity in FIG. 1, it is contemplated that the synthetic data platform 111 may be implemented as a module of any of the components of the system 100 (e.g., a component of the mapping platform 105, machine learning system 121, services platform 125, services 127, UE 107, application 109, vehicle 101, etc.). In another embodiment, one or more of the modules 301-307 may be implemented as a cloud-based service, local service, native application, or combination thereof. The functions of the synthetic data platform 111 and the modules 301-307 are discussed with respect to the figures below.

Figure 4:
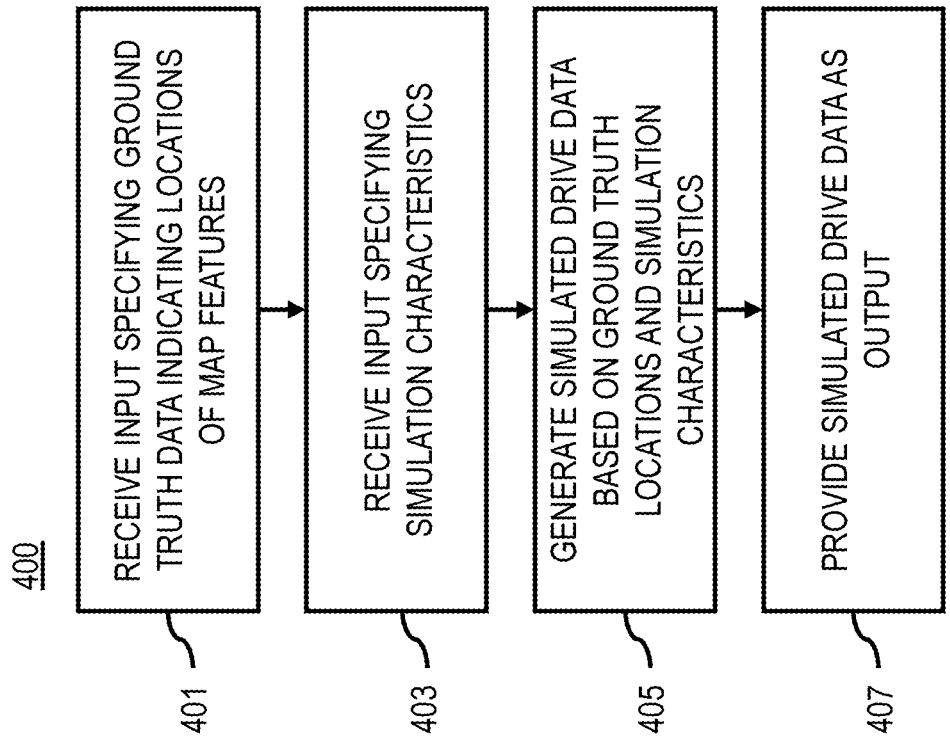
FIG. 4 is a flowchart of a process for generating synthetic drive and sensor observation data, according to one example embodiment.
Figure 11:
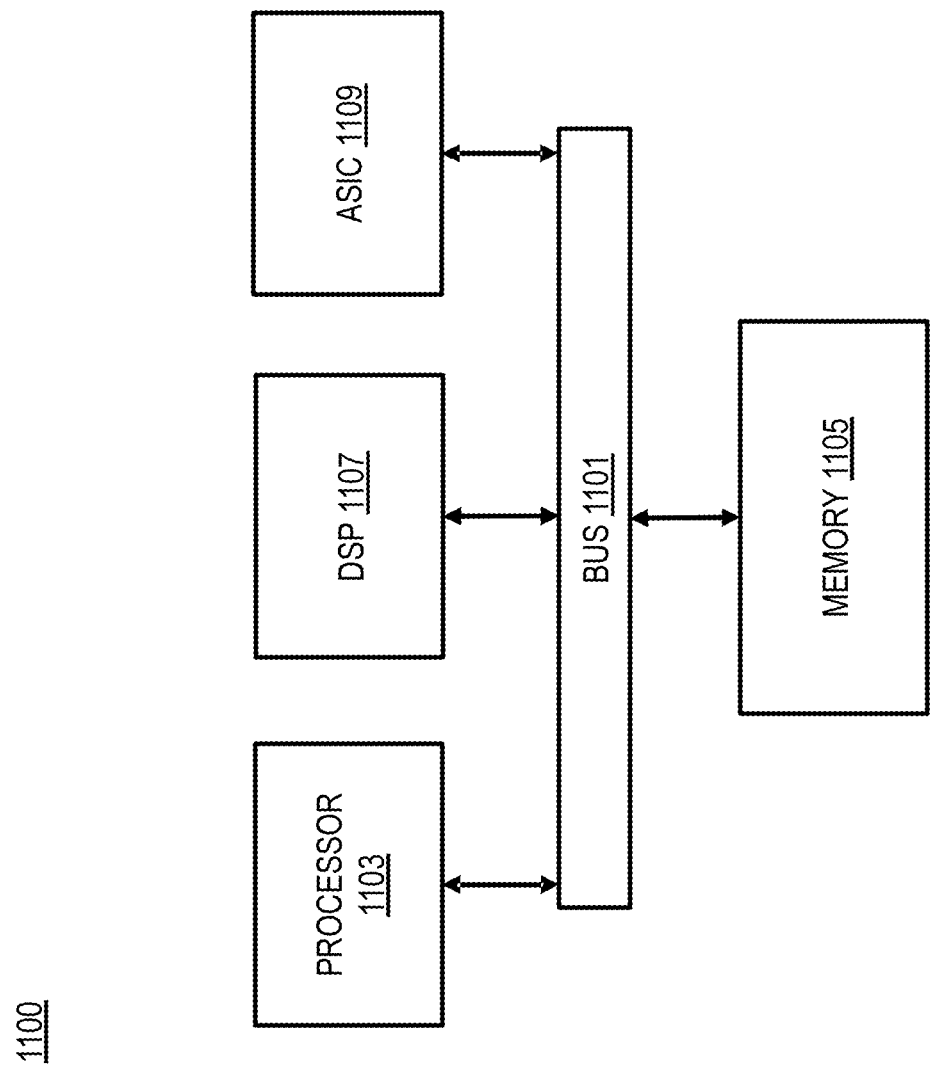
FIG. 11 is a diagram of a chip set that can be used to implement an embodiment of the invention.

FIG. 4 is a flowchart of a process for generating synthetic drive and sensor observation data, according to one example embodiment. In various embodiments, the synthetic data platform 111 and/or any of the modules 301-307 of the synthetic data platform 111 may perform one or more portions of the process 400 and may be implemented in, for instance, a chip set including a processor and a memory as shown in FIG. 11. As such, the synthetic data platform 111 and/or the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the map feature module 301 receives a first input specifying ground truth data (e.g., ground truth input 117) indicating one or more ground truth locations of one or more map features. In one embodiment, the one or more map features can be any feature or object (e.g., road signs) that can be located and simulated in an ROI. The input can specify the location coordinates of where the ground truth feature is to be simulated along with attributes of the features to simulate. Examples of the feature attributes that can be specified in the input include but are not limited to:

Shape: The shape of a road sign can be used to quickly convey specific information, such as a diamond shape for warning signs or an octagon shape for stop signs.

Color: The color of a road sign can also be used to convey information, such as red for stop signs or yellow for warning signs.

Symbol or Icon: A symbol or icon can be used to provide additional information, such as a pedestrian symbol for a crosswalk sign or a speed limit symbol for a speed limit sign.

Label of Sign Type: An explicit text label indicating the sign type (e.g., "stop sign," "yield sign," "no parking sign," "left turn only sign," etc.). This label, for instance, identifies the type of the detected road sign regardless of the specific symbols, text, etc. determined from the sign.

Text: Road signs can also include text, which can be used to provide specific instructions or information, such as a speed limit or the name of a road.

Reflectivity: Reflective materials can be used to enhance the visibility of road signs, especially in low light or nighttime conditions.

Size: The size of a road sign can also be important, as larger signs may be more noticeable to drivers from a distance.

Location: The location of a road sign can also be important, as signs should be placed in areas where they are easily visible to drivers.

In step 403, the map feature module 310 receives a second input specifying one or more simulation characteristics. By way of example, simulating a vehicle drive path and sensor observations involves generating synthetic data that mimics real-world data collected from vehicles 101. To achieve this, certain statistical characteristics of the real-world data can be specified for incorporation or consideration into the simulation including but not limited to:

Temporal Characteristics: The time interval between sensor observations and the speed of the vehicle should be consistent with the real-world data. The distribution of the time interval and speed can be estimated using statistical methods, such as the mean, variance, and standard deviation.

Spatial Characteristics: The spatial distribution of the sensor observations should reflect the real-world data. This can include the distribution of the observations along the drive path, the spatial correlation between observations, and the spatial variability of the observations.

Sensor Characteristics: The simulation should take into account the specific characteristics of the sensors used to collect the observations, such as their accuracy, precision, measurement range, false positive rate, false negative rate, etc.

Environmental Characteristics: The simulation should consider environmental factors that may affect the sensor observations, such as weather conditions, road conditions, and traffic patterns. These factors can be incorporated into the simulation using real-world data or by generating synthetic data that mimics the real-world data.

By incorporating these statistical characteristics into the simulation, the various embodiments described herein can generate synthetic data that accurately reflects the real-world data collected from vehicles 101.

In step 405, the synthetic data platform generates simulated drive data 115 based on the ground truth data and the one or more simulation characteristics. In one embodiment, the simulated drive data 115 includes (a) one or more simulated drive paths within a region of interest encompassing the one or more ground truth locations and (b) one or more simulated sensor observations of the one or more map features. The step 405 is described in more detail with respect to FIG. 5 which is a diagram of a simulation flow for generating synthetic drive and sensor observation data, according to one example embodiment.

Figure 5:
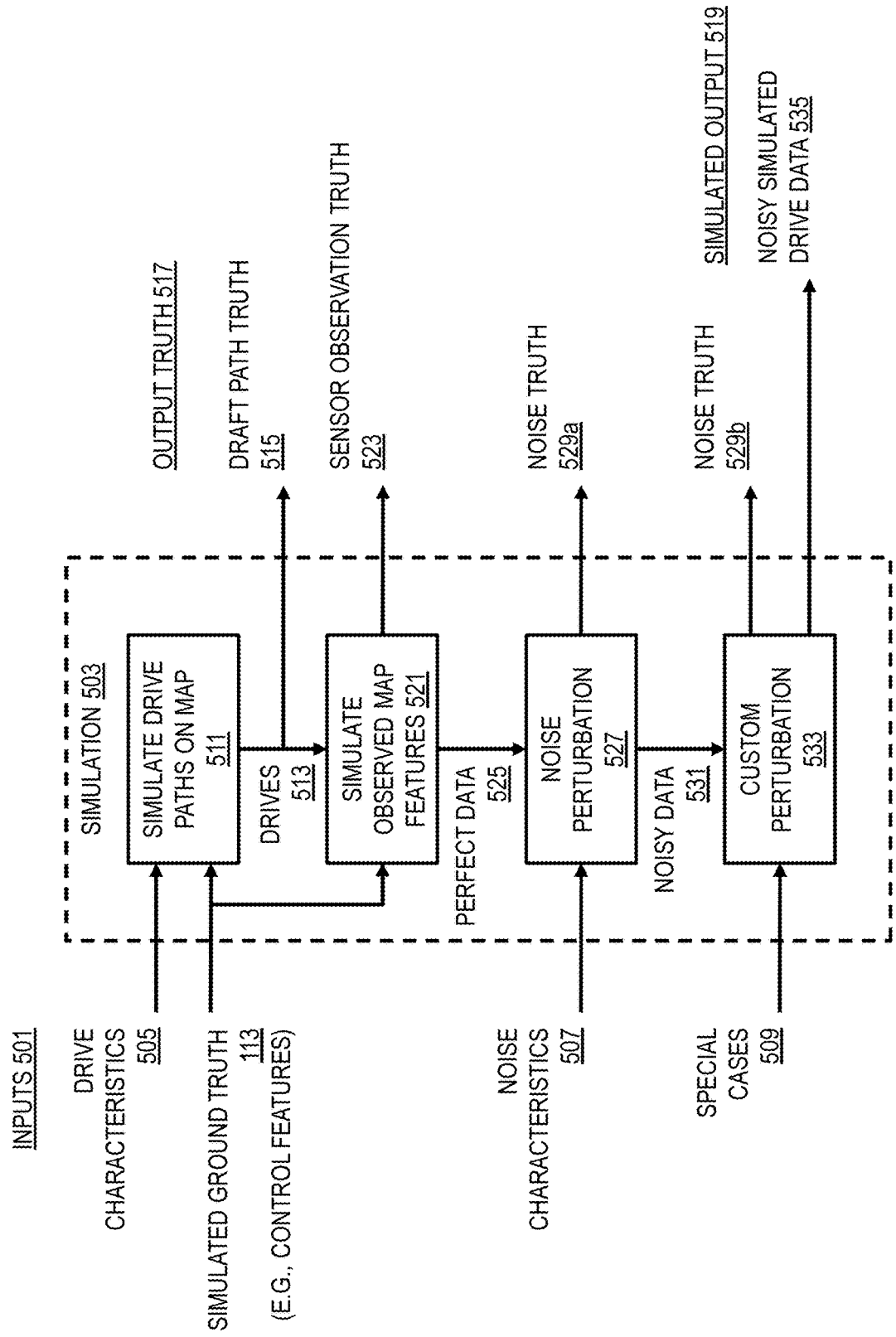
FIG. 5 is a diagram of a simulation flow for generating synthetic drive and sensor observation data, according to one example embodiment.

As shown in FIG. 5, the inputs 501 into the simulation 503 include the simulated ground truth 113. This simulated ground truth 113 can be generated based on the ground truth input 117 received at step 401. The simulated ground truth 113 can include map data representations of a control object/feature specified in the ground truth input 117. For example, if the selected object is a road sign, a map data record (e.g., in the same format as specified for map data in the geographic database 103 or equivalent) can be generated to represent the map feature of interest (e.g., control feature for simulating drives). For each map feature specified in the ground truth input 117, a corresponding simulated data record can be generated to create the set of simulated ground truth 113. As shown, the inputs 501 also include drive characteristics 505, noise characteristics 507, and special cases 509 (e.g., each are different examples of simulation characteristics 119).

As shown in FIG. 5, the drive characteristics 505 (e.g., element of simulation characteristics 119) and simulated ground truth 113 are provided to the process 511 of simulation 503 to simulate drive paths on map. For example, simulated drives and detections will be generated using an input set of simulated ground truth 113 containing all requisite map features along with full attribution (e.g., sign type, dimensions, etc.) for each feature. In one embodiment, the user can also define a region of interest within the map where all drives will be generated.

Figure 6:
FIG. 6 is a diagram illustrating an example input source map for generating synthetic drive and sensor observation data, according to one example embodiment.

FIG. 6 is a diagram illustrating an example input source map 600 for generating synthetic drive and sensor observation data, according to one example embodiment. As shown, road boundaries 601a-601h (e.g., indicated by solid white lines and also collectively referred to as road boundaries 601) and lane markings 603a-603d (e.g., indicated by dashed white lines and also collectively referred to as lane markings 603) indicate drivable road surfaces for simulated drives. Signs and other observables (e.g., stop signs, no parking signs, left turn only signs) contain position and attribution (e.g., sign type). Examples of map features depicted in the FIG. 6 include but are not limited to: signs, poles, lane markings 603, road boundaries 601, barriers, stop lines, crosswalks, and other road markings.

In one embodiment, the drive data module 303 (e.g., via the simulate drive paths on map process 511) can process the inputs 501 along with input source map 600 to any number of drives 513 (e.g., simulated drive paths). For a single drive, first, the process 511 of the simulation 503 will generate a (e.g., true or ideal) simulated drive path based on the road network in the area of interest. The drive path will consist of timestamped six degrees of freedom (6DOF) or equivalent vehicle poses (e.g., vehicle orientation, pointing direction, etc. in three-dimensional space) in absolute coordinates sampled at sensor-appropriate intervals (e.g., 10 Hz) over an automatically determined trajectory over the road network. In one embodiment, the user can tune parameters (e.g., simulation characteristics 119) for the simulated drive paths: e.g., number of turns, speed, traffic density on roads, etc. These simulated drive paths should be realistic in the sense that they resemble the variation and behavior seen in real drives in the same area.

The simulation 503 may be generated by any means, including generative adversarial networks (GANs) or equivalent. For example, a GAN can be used to simulate a vehicle drive path by training the network on real-world driving data. The GAN consists of two neural networks, a generator and a discriminator, that compete against each other in a game-theoretic manner. The generator produces synthetic drive path data, and the discriminator attempts to distinguish between the real and synthetic data. Over time, the generator learns to generate more realistic synthetic drive paths that the discriminator cannot distinguish from real-world data.

To use a GAN to simulate a vehicle drive path, the network is trained on large amounts of real-world driving data, such as GPS coordinates, speed, and acceleration data collected from vehicles. The generator then uses this information to generate simulated drive paths that are similar to the real-world data. The discriminator evaluates the simulated drive paths and provides feedback to the generator, allowing it to learn and improve over time. Once the GAN has been trained, it can be used to simulate synthetic drive paths that are similar to real-world data. This can be useful for testing and simulation purposes as discussed with respect to the various embodiments described herein. Additionally, the GAN can be used to generate realistic drive paths in areas where real-world data is limited or unavailable, such as in new or sparsely populated areas.

As described above, the process 511 can generate a "true or ideal or perfect" drive path (e.g., draft path truth 515) which reflects a path in the region with no noise perturbations applied as part of a set of output truth 517 from the simulation 503. In one embodiment, the true drive path is merely a starting point to all other derivative measurements and is labeled as the draft path truth 515). For example, in one embodiment, the true drive path can be output for reference as the draft path truth 515, but will not be contained in the simulated output 519.

Figure 7:
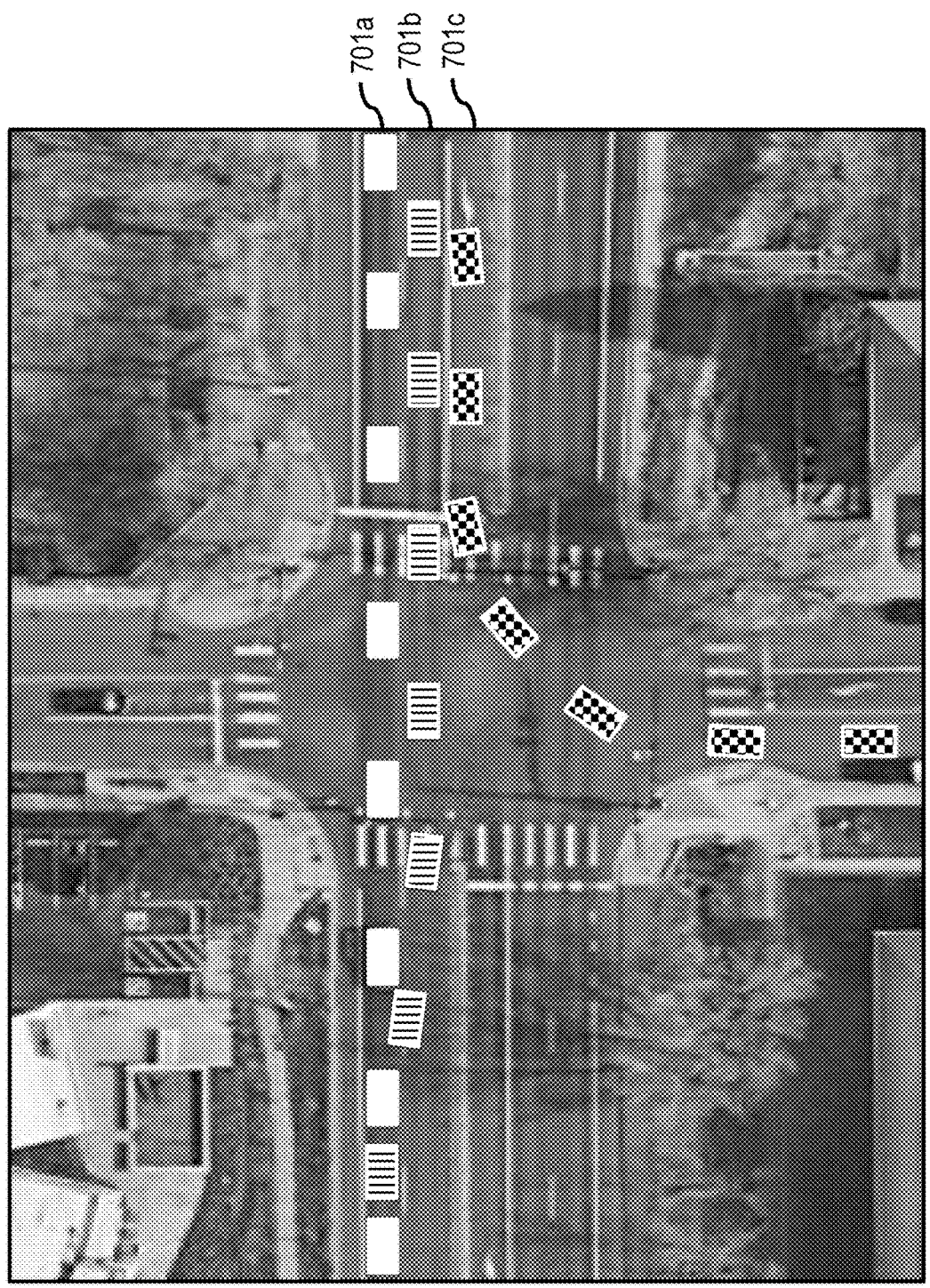
FIG. 7 is a diagram illustrating example vehicle poses from simulated drive paths for generating synthetic drive and sensor observation data, according to one example embodiment.

FIG. 7 is a diagram illustrating example map 700 with vehicle poses from simulated drive paths for generating synthetic drive and sensor observation data, according to one example embodiment. More specifically, the FIG. 7 illustrates three simulated drive paths: (1) simulated drive path 701*a* (indicated by a sequence of white rectangular boxes); (2) simulated drive path 701*b* (indicated by a sequence of rectangular boxes shaded with vertical lines); and (3) simulated drive path 701*c* (indicated by a sequence of rectangular boxes shaded with a checkboard pattern). In this example, the spatial difference between each rectangular box in simulated drive path 701*a*-701*c* represents the sampling location (e.g., based on a defined sampling frequency) for reporting locations/observations along each simulated drive path 701*a*-701*c*. In addition, the orientation of each rectangular box represents the vehicle pose at the corresponding location. Vehicle lane changes (e.g., simulated drive path 701*b*) and turns (e.g., simulated drive path 701*c*) are determined by the simulation 503 and driven by the input drive characteristic parameters 505.

In one embodiment, from the simulated drive paths (e.g., draft path truth 515), sensor measurements can be simulated (e.g., simulated sensor observations) based on the following positioning methods:

Odometry—the relative pose displacement (position and orientation) of the vehicle from one timestamp to the next. These timestamps may be synchronized with the time stamps used for the true generated pose path.

Global Navigation Satellite System (GNSS)—the absolute world position (and optionally the orientation) of the vehicle at a timestamp. For example, with respect to orientation, a compass or other equivalent sensor can be simulated to read orientation. These timestamps may not necessarily be synchronized with those used for the true generated pose path.

Location Referencing—the relative pose displacement (position and orientation) of the vehicle from one timestamp to the next can be determined by simulating measurement distances to known/recognized objects in the sensors' field of view, and triangulating based on those signals. For example, objects may be recognized using computer vision, lidar scans, radar, ultrasound (e.g., a shorter ranges), a sensor fusion process involving any of the referenced sensors or equivalent, or any combination thereof.

Dead Reckoning—the relative pose displacement (position and orientation) of the vehicle from one timestamp to the next can be based on simulating sensors (e.g., an Inertial Measurement Unit (IMU) sensor or equivalent) that are used for dead reckoning. For example, with an IMU sensor, the system 100 can detect movement in all three dimensions and calculate the relative orientation, pitch, acceleration, speed, etc. of the vehicle from accelerometer readings. In one embodiment, compass simulation can be combined with other simulated positioning technologies such as but not limited to odometry to refine dead reckoning estimations or simulations.

In one embodiment, the sensor observation module 305 (e.g., via process 515 of the simulation 503) generates the simulated sensor observations (e.g., observations of the map features) at timestamps along the drive paths. A simulated sensor observation, for instance, consists of a relative position of the observable (e.g., meters forward, left, up) from the simulated vehicle at the timestamp (e.g., given its true generated pose). Simulated sensor observations will also contain a measurement of relevant attribution (e.g., sign type, color, etc.) of observed map feature (e.g., ground truth feature or control feature of the ground truth data 113). Each simulated sensor observation can indicate, as ground truth, its correspondence to a true feature on the map which is deemed by the simulation 503 to be visible from the corresponding vehicle at that time. This will be sensor-specific and reflect the behavior of the simulated sensor (e.g., another sensor reports observations at the moment the feature moves out of the field of view of a camera). In one embodiment, simulated sensor observations can also be generated as "perfect" observations such that when a ground truth control feature or object is calculated to be within the detection capabilities and position of the sensor on the simulated vehicle and drive path, then a simulated sensor observation will be generated with perfect accuracy of feature/object identification, location, and/or other applicable attributes. This "perfect" sensor observation can be output as sensor observation truth 523. As with the true or ideal simulate drive path, the perfect sensor observation truth 523 will be used for deriving actual simulated sensor observation data perturbed according to the specified simulation characteristics 119.

In summary, the output of the initial processes 511 (for simulating drive paths) and 521 (for simulating senor observations on the true drive paths) can be a combination of the true simulated drive paths (e.g., draft path truth 515) and perfect simulated sensor observations (sensor observation truth 523). This combination is referred to in FIG. 5 as perfect data 525.

Figure 8A:
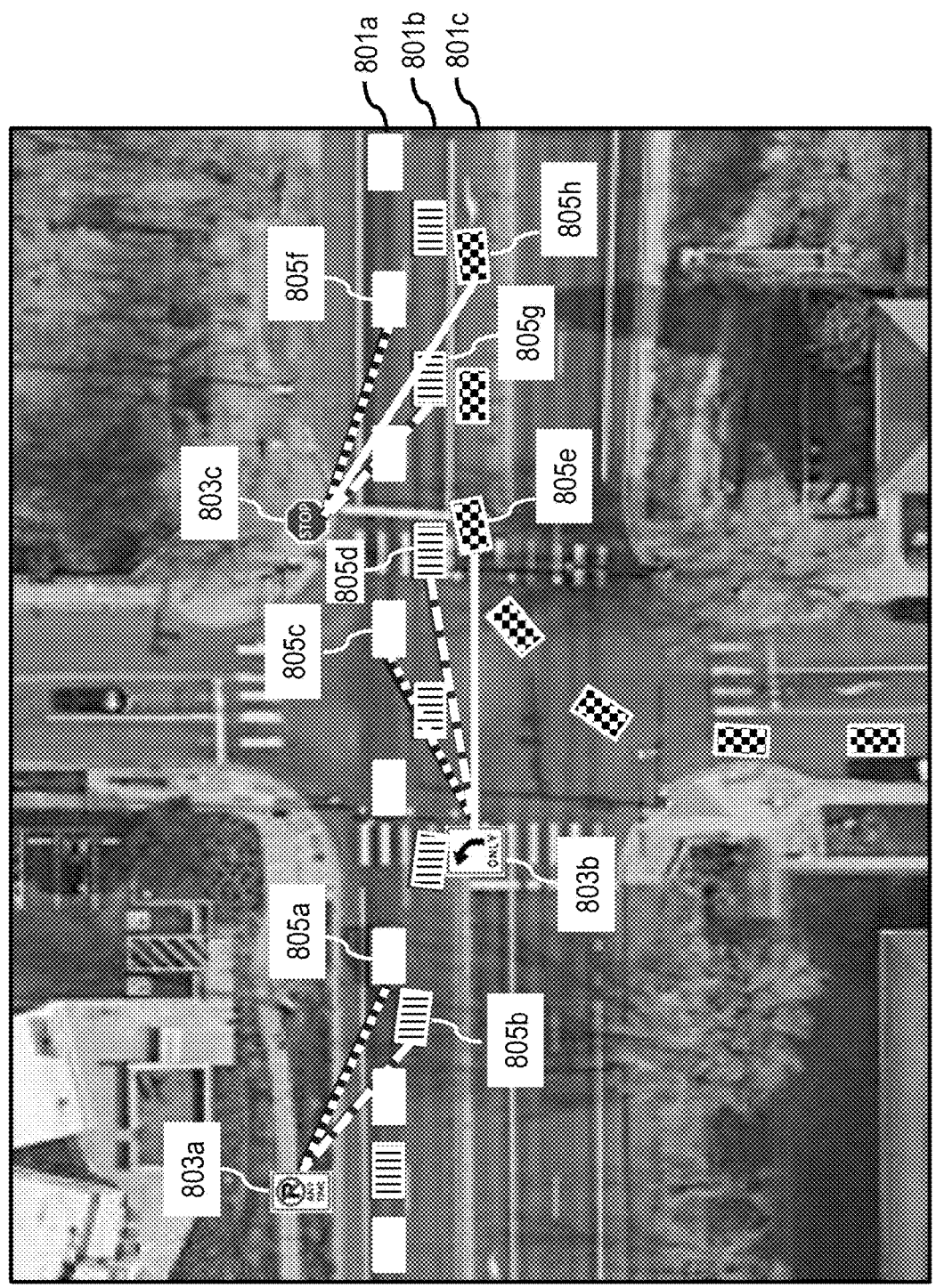
FIG. 8A is a diagram illustrating an example of "perfect" simulated drive data for generating synthetic drive and sensor observation data, according to one example embodiment.

FIG. 8A is a diagram illustrating an example of "perfect" simulated drive data 115 (e.g., perfect data 525) for generating synthetic drive and sensor observation data, according to one example embodiment. "Perfect" (as used herein) refers to simulated drive data 115 in which the simulated drive paths and simulated sensor observations have not been perturbed by noise or other simulation characteristics 119 that would degrade or obscured the accuracy of a simulated drive path and/or simulated sensor observation. In other words, the locations of the simulated vehicles in their respective drive paths and the feature detections in the sensor observations both have no error (e.g., positioning error, detection error, etc.). Similar to the examples of FIG. 7, FIG. 8A illustrates simulated drive paths: (1) simulated drive path 801*a* (indicated by a sequence of white rectangular boxes); (2) simulated drive path 801*b* (indicated by a sequence of rectangular boxes shaded with vertical lines); and (3) simulated drive path 801*c* (indicated by a sequence of rectangular boxes shaded with a checkboard pattern). The simulated drive paths 801*a*-801*c* are not perturbed by noise or other simulation characteristics 119 that affect their accuracy relative to the draft path truth 515 and sensor observation truth 523. Accordingly, map feature 803*a* (e.g., a no parking sign) is detected with perfect accuracy (e.g., detected/estimated location matches ground truth location) by simulated sensor observation 805*a* of simulated drive path 801*a* and by simulated sensor observation 805*b* of simulated drive path 801*b*. Map feature 803*b* (e.g., a left turn only sign) is visible from all three paths 801*a*-801*c* and are detected in respective simulated sensor observations 805*c*-805*e*. Similarly, map feature 803*c* (e.g., a stop sign) is visible from all three paths 801*a*-801*c* and are detected in respective simulated sensor observations 805*f*-805*h*. Visibility of the map features, for instance, is determined by the simulation 503 using vehicle poses.

In one embodiment, the simulation of the sensor observations can also consider input simulation characteristics 119 to characterize false alarm (e.g., false positive) and missed detections (e.g., false negative detections). In the case of false alarms, instead of a ground truth correspondence to a true feature, there will be an indication that the detection has no true correspondence. In the case of missed detections, there shall be some ground truth indication that the drive should have observed a feature, but failed to do so.

As discussed above, the perfect data 525 (e.g., draft path truth 515 and sensor observation truth 523) can be perturbed with noise to more accurately reflect real world data and observations which often are far from perfect. For example, the perfect data 525 can be processed by a noise perturbation process 527 to generate noise truth 529a and corresponding noisy simulated data 531 (e.g., simulated drive data 115 generated by adding noise to the perfect data 525 based on simulation characteristics 119). Below are example perturbations that can be applied.

In one embodiment, the noise perturbation process 527 can introduce random perturbations. The true values of the three raw measurement types indicated above (odometry, GNSS and observations represented by draft path truth 515 and sensor observation truth 523) can each be perturbed to simulate measurement noise. The extent of perturbations is parametrized by user input characterization of the noise (e.g., simulation characteristics 119). Below we indicate the types of perturbations involved with each measurement. The amount of random perturbation will also be included in the output. Examples of types of random perturbations include but are not limited to:

GNSS (or Absolute Location) random perturbations, for instance, are generated according to:
Earth Centered Earth Fixed (ECEF) (x, y, z) Position— perturbed by additive white Gaussian noise (AWGN) with specified covariance;

Odometry (Relative Location) random perturbations, for instance, are generated according to:
(x, y, z) position change—perturbed by AWGN with specified covariance; and
Orientation quaternion change—perturbed by AWGN with specified covariance (performed on some useful representation; e.g., perturb rotation axis and rotation amount);

Sensor Observation random perturbations, for instance, are generated according to:
Missed detections—simulate missed detections by randomly removing detections according to PMD parameter;
False alarms (false positives)—generate some detections randomly according to a PFA parameter;
(x, y, z) position measurement—perturbed by AWGN with specified covariance;
Orientation quaternion measurement—when applicable, perturbed by AWGN with specified covariance; and
Attribution—perturb measured attribution according to some input parameters
Continuous numeric values (e.g., height)—perturb with AWGN with specified covariance; and
Discrete labels (e.g., sign type)—perturb with a confusion matrix.

Figure 8B:
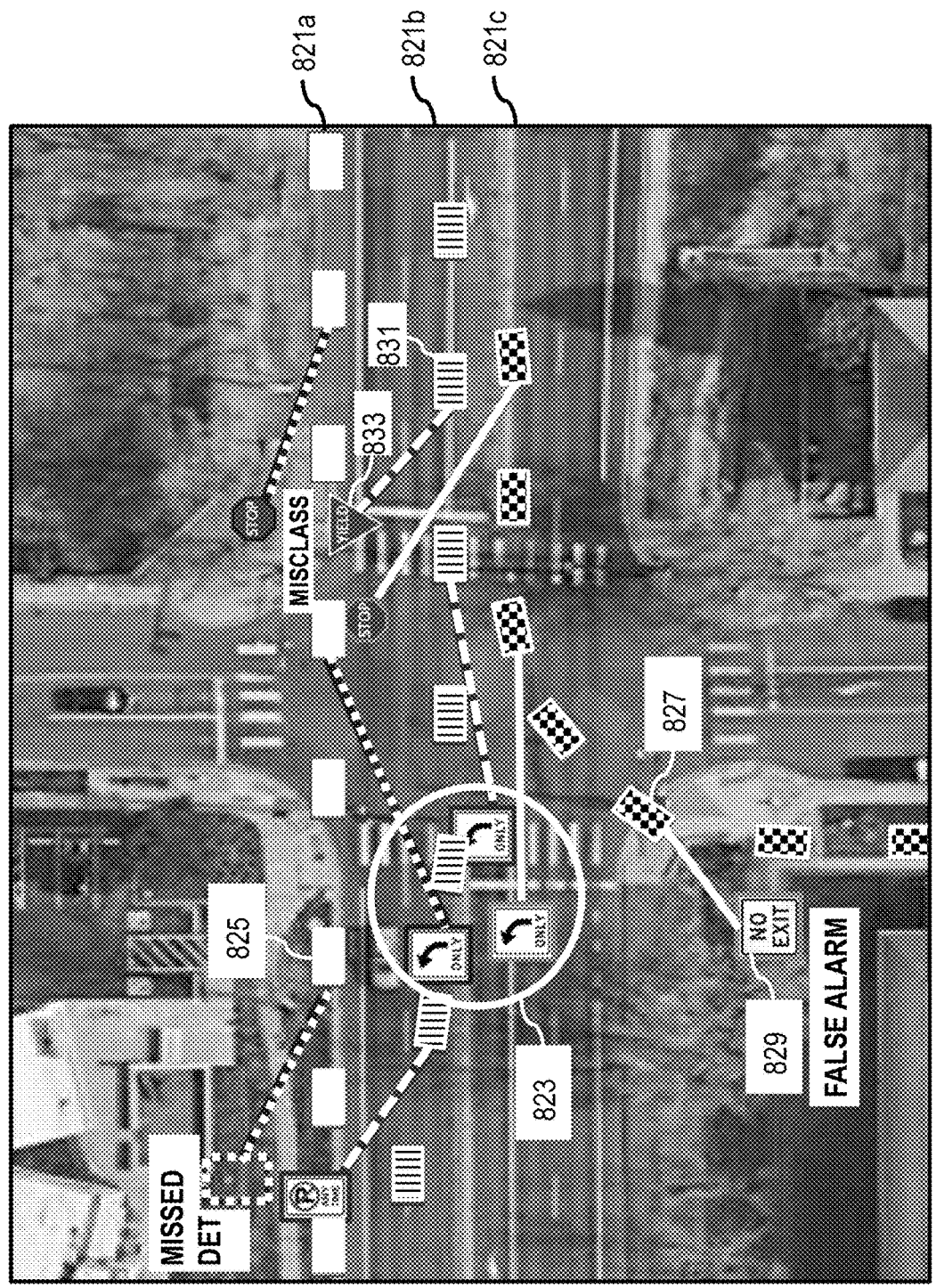
FIG. 8B is a diagram illustrating an example of "noisy" simulated drive data for generating synthetic drive and sensor observation data, according to one example embodiment.

FIG. 8B is a diagram illustrating an example of "noisy" simulated drive data for generating synthetic drive and sensor observation data, according to one example embodiment. Relative to the example simulated drives 801a-801c of FIG. 8A, the perturbations include:

GNSS offset—e.g., the simulated drive paths 821a-821c of FIG. 8B are randomly offset from the corresponding true simulated drive paths 801a-801c of FIG. 8A;
Observed position offset—e.g., the three observed locations 823 shown in FIG. 8B of the left turn only sign 803b of FIG. 8A is offset randomly from the true observed location;
Missed detections—e.g., simulated sensor observation 825 of simulated drive path 921a as shown in FIG. 8B misses a detection of the no parking sign 803a of FIG. 8A;
False alarms—e.g., simulated sensor observation 827 of simulated drive path 821c erroneously observes a No Exit sign 829 that does not appear in the ground truth data 113 of FIG. 8A; and
Attribution errors—e.g., simulated sensor observation 831 of simulated drive path 821b as shown in FIG. 8B misclassified a stop sign 803c of FIG. 8A as a yield sign 833.

In addition or as an alternative to the noise perturbation process 527, the simulation 503 can also apply a custom perturbation process 533 to process noisy data 131 using special cases 509 and generate noise truth 529b and/or the noisy simulated drive data 535 (e.g., the final simulated drive data 115) provided as the simulated output 519 from the simulation 503. In one embodiment, the special cases 509 and custom perturbation process 533 are based on manual perturbation. For example, there are some perturbations that the user may wish to explicitly define manually— this includes any constant global offsets. These enable the user to define and explore certain case studies (e.g., special cases 509), and how these modification impact map building and/or estimation algorithms. Example of manual perturbations include but are not limited to:

Specifying 5-meter gaps for lane markings;
Specifying 2-meter absolute offset for GNSS;
Deleting linestrings (e.g., representations of linear map features such as roads, boundaries, lane markings, etc. as a sequence of vertices or nodes connected by line segments) on merges up to 1 meter on each connection; and
Creating traffic light signaling patterns which are not synchronized.

In summary as shown in FIG. 5, the simulation 503 provides an input/output interface for providing inputs 501 to the simulation 503 and receiving output truth 517 and simulated output 519 from the simulation 503. The inputs 501 are parameters of the simulation 503 that are summarized as follows:

Map Data input comprising:
A complete map of the features and their attributions (e.g., map data of the geographic database 103 of the mapping platform 105 (e.g., operated by mapping/navigation service provider); and
A region of interest bounding box or mask.

Manual Perturbation input (e.g., for generating data for test cases)—The user may supply parameters or adjustments that are not random, but are defined by the user. These define the extent of any manual perturbations, including but not limited to:
Extent of gaps for lane markings;
Extent of absolute offset for GNSS;
Extent of line feature merges; and
Extent of traffic light signaling asynchronization.

Source Characteristics input (e.g., for automated perturbation) including but not limited to:

Drive Parameters—e.g., these parameters indicate some characterization of the drives themselves.
  Number of drives to simulate;
  Traffic density—indication of which roads are most likely to contain drives;
  Turn density—characterization of the number or frequency of turns made by vehicles;
  Lane change frequency—characterization of the number of lane changes;
  Speed—indication of how fast simulated vehicles will travel; perhaps indicated by speed limit data on road links; and
  Stop frequency—indication of how often vehicles stop at lights (e.g., indicated by metadata at traffic lights).
Position and pose covariances—e.g., covariance matrices for the AWGN to add to all position and pose measurements.
  GNSS noise covariance—3×3 covariance matrix in meters;
  Odometry covariance—3×3 covariance matrix in meters;
  Odometry orientation covariance; and
  Observation position covariance—3×3 covariance matrix in meters. This potentially is defined per feature type, or per feature class (e.g., separate for point features than line features)
Observation Errors
  Probability of missed detection (e.g., false negative)—the probability that a vehicle will not record an observation of a visible a feature due to occlusion or other error.
    In one embodiment, define this separately for each feature type or class.
  Probability of false alarm (e.g., false positive)—the probability that a vehicle will record an observation of a non-existent feature. In one embodiment, this false positive probability can be based on the fraction of detections which are false.
    In one embodiment, define this separately for each feature type or class.
  Attribution Variations—this will vary from feature to feature and generally involves AWGN variances or covariances, and any applicable confusion matrices.
    Attribute covariance matrices—the variance for AWGN to add to numerical attributes (e.g., sign dimensions); and
    Attribute confusion matrices—a confusion matrix for discrete labeled attributes (e.g., sign type) which characterize simulated misclassifications.

In one embodiment, the outputs of the simulation consist of the simulated drive sensor data (e.g., simulated output 519), and the ground truth (e.g., output truth 517). Additional details of these outputs are described below:
Drive Data (e.g., simulated output 519)—Any number of drives can be output, as specified by the user; each drive will be written out in a designated file format and include timestamped measurements of:
  GNSS vehicle positions—global (lat, lon, alt) world position measurement;
  Odometry vehicle displacement—relative FLU displacement and quaternion rotation; displacement measured relative to the previous odometry measurement; and
  Sensor observation data-relative displacement from vehicle position to observed map feature, along with any relevant attribution encoded in the designated format.
Ground Truth (e.g., output truth 517)—in one embodiment, the following ground truth data can be output in any combination:
  Pose path—for the timestamp of every measurement (of any type) within the drive data, include the true ECEF vehicle position and its true pose quaternion;
  Point feature observation correspondence—for each observation of a point feature (e.g., sign, pole), the true observed map feature shall be indicated;
  Line feature observation correspondence—for each observation of a point feature (e.g., lane marking, barrier), the true observed map feature shall be indicated, along with the world ECEF coordinate on that feature;
  False alarm "correspondence"—if a feature observation simulates a false alarm, it can be indicated;
  Missed detections—any simulated missed detection shall be indicated by a timestamped observation measurement that would otherwise have been made, should the detection not have been missed;
  True perturbation values—for each measurement value, indicate the precise perturbation that was applied (e.g., the sampled random perturbation); and
  Manual perturbations—a quantification of any adjustments that are caused by manual perturbations.

In step 407, the output module 307 provides the simulated drive data 115 (and/or ground truth data 113) as an output. As previously described and illustrated in FIG. 2, in one embodiment, the output can be used for evaluation of map building processes (e.g., automated map creation) using simulated data (e.g., simulated drive data 115 and/or simulated ground truth data 113). The simulated data files (e.g., a designated file format) can be passed into any pipeline to produce a conflated estimate of the map state, complete with all map features and their corresponding attribution. This estimate can be evaluated against the simulated ground truth map using any available service performance, precision, recall, etc. metrics for various map features and classes. By way of example, the metrics for the various map features and/or classes include but are not limited to: (1) error rate for stop sign detection (e.g., including error related to sign location, heading, etc.), (2) error rate for yield sign detection, (3) error rate for text detection in signs, (4) error rate for road furniture detection, and/or the like. These metrics can also be determined under different simulated situations or contexts including but not limited to single lane road, intersections, multi-lane roads, etc. under different lighting, weather, etc. conditions. It is noted that these example metrics, features, classes, situations, contexts, etc. are provided by way of illustration and not as limitations. It is contemplated that any permutation of the above metrics/attributes/factors/etc. (including others not provided as examples) can be applied in any combination to yield diverse simulated examples in the simulated drive data 115. In one embodiment, such permutations and associated errors can be used to improve the training of feature detectors (e.g., used for map feature detection, map building, and/or any other segment of the map building/evaluation pipeline).

In one example use case of the applying the output of the simulated drive data 115, the system 100 (e.g., via the mapping platform 105, any of the services 127 of the services platform 125, content providers 129, and/or any other equivalent component) can generate a data marketplace listing comprising the simulated drive data 115, with corresponding metadata (e.g., location/area, time of day, weekdays/weekend/holiday/season, traffic levels, weather conditions, positioning noise level, detection noise level, etc.). Then service providers can access the marketplace to use the simulated data 115 for map building evaluation or any other application that depend on such data.

In another example, the output of the simulated drive data 115 can trigger an automated map creation system (e.g., mapping platform 105) to generate map data based on the simulated drive data 115. In yet another example, the output can be used to update a database of simulated drive data corresponding to a region. Further, the output can be used to submit simulated drive data 115 to an infrastructure planning/traffic forecast application (e.g., provided by one or more of the services 127 of the service platform 125), and/or generate a real-time stream of simulated drive data 115 (e.g., for testing real or near-real time map updates by the mapping platform 105 or equivalent).

One element of the testing or evaluation against ground truth described above is to estimate the correspondence between the estimates and ground truth, in order to evaluate the accuracy of the estimate's position and attribution. For example, the system 100 can perform this estimate-to-truth correspondence pairing automatically, and can carry out matching to minimize distance between estimated map data and the paired ground truth.

In one embodiment, the various embodiments of the simulation process described herein can output a ground truth feature correspondence for every observation. It is possible to map this to a correspondence between every estimated map feature and a ground truth feature. This can eliminate the need to estimate the correspondence via distance, and can provide more meaningful feature pairings, resulting in more meaningful/representative performance metrics.

One example use case for parameter tweaking for evaluating the robustness of the map conflation/estimation system is to test its sensitivity to various sensor errors or challenging scenarios. These variations are easy to execute within simulated data since the user has full control over the data and truth. Consider various types of parameters adjustments. Following each of the adjustments, new simulated data can be generated, which are then fed into estimation pipelines, and re-evaluated against ground truth. The new performance metrics (precision/recall) indicate the impact that the parameter adjustment has on estimation pipeline's performance.

In another example use case, the system 100 can perform perturbation tweaking. Example tweaks to make would be any adjustments to any of the observation error parameters (e.g., position covariances). In this case, the drive paths could remain the same as the original generations (e.g., draft path truth 515), but new noise is generated according to adjustments in one or more of the noise parameters, and thus the measured positions or attributions are re-calculated and exported to new simulated data.

In one embodiment, the system 100 can perform drive path tweaking. For example, the simulated drive paths can be adjusted by tweaking any of the parameters relating to the drive paths themselves (e.g., turn frequency). In this case, the simulated drive paths are re-generated in full, which also requires re-generating the observations. This is a more wholesale adjustment than the perturbation tweaking.

In one embodiment, the system 100 can perform ROI (Region of Interest) adjustment. A more high-level adjustment would be to have the user select an entirely new region for simulation. The user may wish to perform several simulations in different ROIs to capture performance varied by setting—e.g., highway vs. urban roadways; 4-way intersections vs. 3-way intersections; gore areas vs. not; etc.

In one embodiment, the system 100 can verify the simulation itself. For example, implementation of the various embodiments of the system 100 can be evaluated for correctness. This verification can be carried out in two respects: the drive simulation, and the measurement/perturbation. The verifications can be made using real drive data. The system 100, for instance, can procure two separate and disparate groups of drives: a training set and a verification set. The training set will be provided to the implementation for its own verification and training; the verification set shall be reserved for an external or separate private verification of the simulations.

In one embodiment, the system 100 can perform simulated drive verification. For example, the system 100 may attempt to verify the simulated drives in terms of measured statistics for each of the "drive parameters" mentioned in the various embodiments above. This verification can be done by statistically measuring the "parameter"/characteristic both for the batch of simulated drives and for a batch of real world drives (i.e., non-simulated drives) which pass through the ROI. Examples of these drive parameters include but are not limited to:

Traffic density—for every section of road, measure the fraction of drives that have occupied the section; compare real and simulated densities;

Turn density—count the number and frequency of turns made (from one road to another); compare real and simulated densities;

Lane change frequency—for every section of road, count the number and frequency of lane changes; compare real and simulated densities;

Speed—for every section of road, measure the average speed of drives that have occupied the section; compare real and simulated speeds; and Stop frequency—for every intersection, measure the frequency of stops at the intersection from each direction; compare real and simulated frequencies.

In one embodiment, the system 100 can perform simulated measurement verification. The simulation's job is to generate observations according to a model, and a test of validity is to measure the generation to see if it fits the desired model. In particular, all of the perturbation parameters can be empirically measured using the generated data. Each parameter type can use a different method of verification:

Position covariances—measure the difference between the generated "measured" value and the corresponding ground truth over a large number of samples, and then take the sample covariance of the error. This sample covariance should closely match the position covariance parameter.

Attribute covariance—measure the difference between the generated "measured" numeric attribute and the original ground truth over a large number of samples, and then take the sample covariance of the error. This sample covariance should closely match the attribute covariance.

Attribute confusion matrices—measure any discrepancy between the generated "measured" attribute label and the true one. Over a large number of samples, create a sample confusion matrix. This sample confusion matrix can closely match the input attribute covariance matrix/

Returning to FIG. 1, as shown and discussed above, the system 100 includes the synthetic data platform 111 for providing synthetic ground truth drive and sensor observation data. In some use cases, the system 100 can include machine learning system 121 that uses a neural network or other machine learning models to provide synthetic ground truth drive and sensor observation data. In one embodiment, the neural network of the machine learning system 121 can include a generative adversarial network (GAN) to generate simulated ground truth data 113 and/or simulated drive data 115.

In one embodiment, the synthetic data platform 111 has connectivity or access to a one or more databases for storing the simulated ground truth data 113 and/or simulated drive data 115 according to the various embodiments described herein, and as well as a geographic database 103 for retrieving mapping data and/or related attributes for creating simulated ground truth data 113 and/or simulated drive data 115. In one embodiment, the geographic database 103 can include electronic or digital representations of mapped geographic features to facilitate generating synthetic ground truth drive and sensor observation data. In one embodiment, the synthetic data platform 111, machine learning system 121 and/or mapping platform 105 have connectivity over a communication network 123 to the services platform 125 that provides one or more services 127. By way of example, the services 127 may be third-party services that rely on location-based services created or developed using the simulated ground truth 113 and/or simulated drive data 115. By way of example, the services 127 include, but are not limited to, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 127 uses the output of the synthetic data platform 111, machine learning system 121 and/or of the mapping platform 105.

In one embodiment, the synthetic data platform 111, machine learning system 121, and/or mapping platform 105 may be platforms with multiple interconnected components. The synthetic data platform 111, machine learning system 121, and/or mapping platform 105 may include multiple servers, intelligent networking devices, computing devices, components and corresponding software for generating labeled synthetic image data for machine learning. In addition, it is noted that the synthetic data platform 111, machine learning system 121, and/or mapping platform 105 may be separate entities of the system 100, a part of the one or more services 127, a part of the services platform 125, or included within the UEs 107 and/or vehicle 101.

In one embodiment, content providers 129 may provide content or data (e.g., including geographic data, 3D models, parametric representations of mapped features, etc.) to the synthetic data platform 111, the machine learning system 121, the mapping platform 105, the services platform 125, the services 127, the UEs 107, the vehicle 101, and/or an application 109 executing on the UE 107. The content provided may be any type of content, such as sensor data, map content, textual content, audio content, video content, image content, etc. used for generating simulated data. In one embodiment, the content providers 129 may provide content that may also aid in generating simulated data. In one embodiment, the content providers 129 may also store content associated with the synthetic data platform 111, geographic database 103, machine learning system 121, mapping platform 105, services platform 125, services 127, UE 107, and/or vehicle 101. In another embodiment, the content providers 129 may manage access to a central repository of data, and offer a consistent, standard interface to data, such as a repository of the geographic database 103.

In one embodiment, the UE 107 and/or vehicle 101 may execute a software application 109 to capture sensor or other observation data for processing by synthetic data platform 111 according the embodiments described herein. By way of example, the application 109 may also be any type of application that is executable on the UE 107 and/or vehicle 101, such as autonomous driving applications, mapping applications, location-based service applications, navigation applications, content provisioning services, camera/imaging application, media player applications, social networking applications, calendar applications, and the like. In one embodiment, the application 109 may act as a client for the synthetic data platform 111 and/or mapping platform 105 and perform one or more functions associated with providing simulated data alone or in combination with the synthetic data platform 111 and/or mapping platform 105.

By way of example, the UE 107 is any type of computer system, embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 107 can support any type of interface to the user (such as "wearable" circuitry, etc.). In one embodiment, the UE 107 may be associated with the vehicle 101 or be a component part of the vehicle 101.

In one optional embodiment, the UE 107 and/or vehicle 101 are configured with various sensors for generating or collecting sensor observations (e.g., for processing by the machine learning system 121 and/or mapping platform 105), related geographic data, etc. In one embodiment, the sensed data represents sensor data associated with a geographic location or coordinates at which the sensor data was collected. In this way, the sensor data can act as observation data that can be evaluated using the synthetic data generated by the synthetic data platform 111. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of optional sensors of the UE 107 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 107 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 107 and/or vehicle 101 may include GPS or other satellite-based receivers to obtain geographic coordinates or signal for determine the coordinates from satellites. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In another optional embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the synthetic data platform 111, machine learning system 121, mapping platform 105, services platform 125, services 127, UE 107, vehicle 101, and/or content providers 129 optionally communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
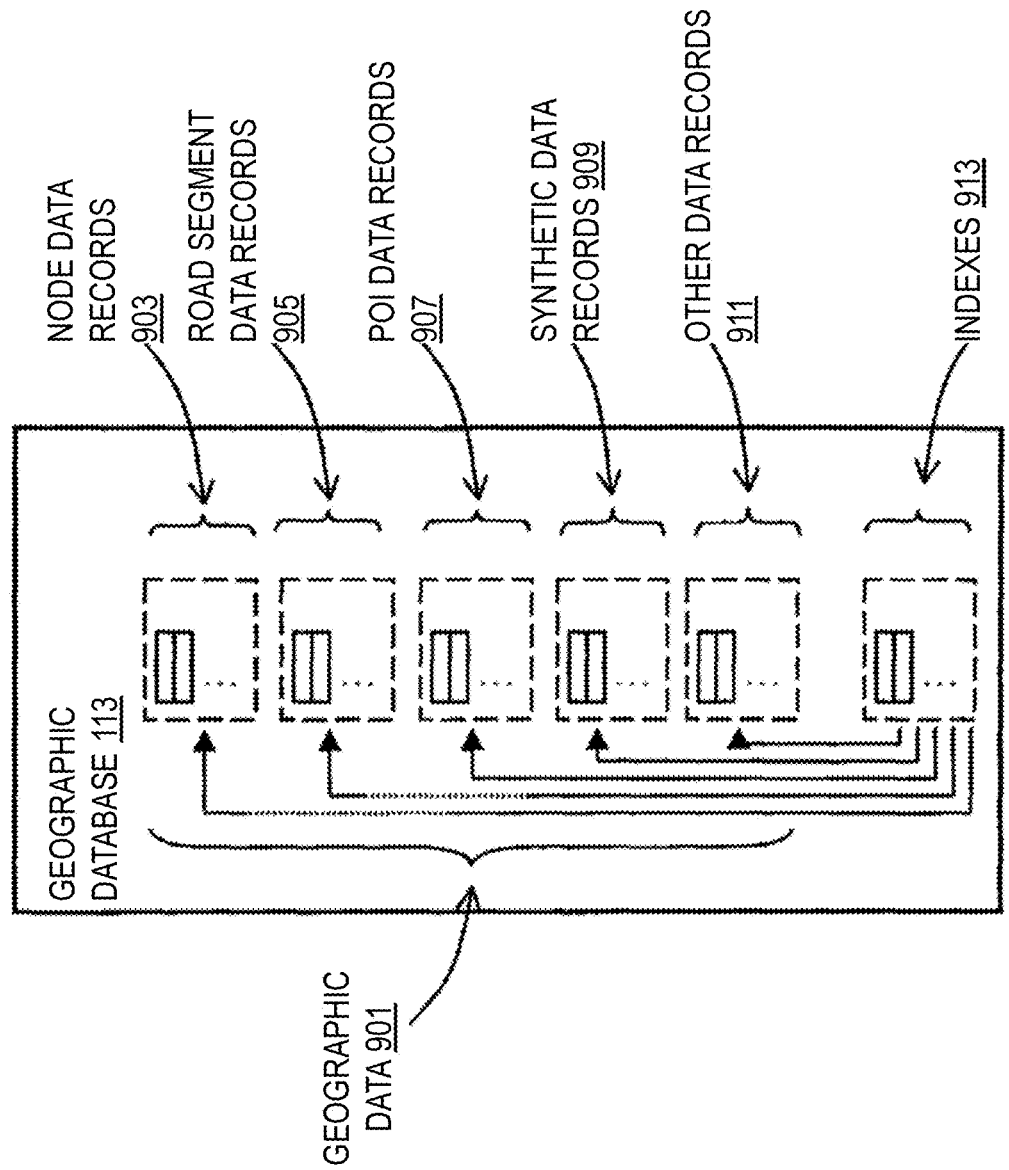
FIG. 9 is a diagram of a geographic database, according to one embodiment.

FIG. 9 is a diagram of a geographic database, according to one embodiment. In one embodiment, the geographic database 103 includes geographic data 901 used for (or configured to be compiled to be used for) mapping and/or navigation-related services, such as for video odometry based on the parametric representation of signs include, e.g., encoding and/or decoding parametric representations into object models of signs. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 103.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 103 follows certain conventions. For example, links do not cross themselves and do not cross each other except at a node. Also, there are no duplicated shape points, nodes, or links. Two links that connect each other have a common node. In the geographic database 103, overlapping geographic features are represented by overlapping polygons. When polygons overlap, the boundary of one polygon crosses the boundary of the other polygon. In the geographic database 103, the location at which the boundary of one polygon intersects the boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 103 includes node data records 903, road segment or link data records 905, POI data records 907, synthetic data records 909, other records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 103. In one embodiment, the indexes 913 may be used to quickly locate data without having to search every row in the geographic database 103 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 103 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 103 can include data about the POIs and their respective locations in the POI data records 907. The geographic database 103 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 103 can also include synthetic data records 909 for storing simulated ground truth data 113, simulated drive data 115, data used for generating the simulated data, and or any related data. In one embodiment, the synthetic data records 909 can be associated with one or more of the node records 903, road segment records 905, and/or POI data records 907 to associate the simulated data with specific geographic locations. In this way, the simulated data can also be associated with the characteristics or metadata of the corresponding record 903, 905, and/or 907.

In one embodiment, the geographic database 103 can be maintained by the content provider 129 in association with the services platform 125 (e.g., a map developer). The map developer can collect geographic data to generate and enhance the geographic database 103. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 107) along roads throughout the geographic region to observe features and/or record information about them, for example. Also, remote sensing, such as aerial or satellite photography, can be used.

The geographic database 103 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 107, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing synthetic ground truth drive and sensor observation data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s)

thereof and accompanying software and/or firmware. As another example, the term 'circuitry' as used herein also includes, for example, a baseband integrated circuit or applications processor integrated circuit for a mobile phone or a similar integrated circuit in a server, a cellular device, other network device, and/or other computing device.

Figure 10:
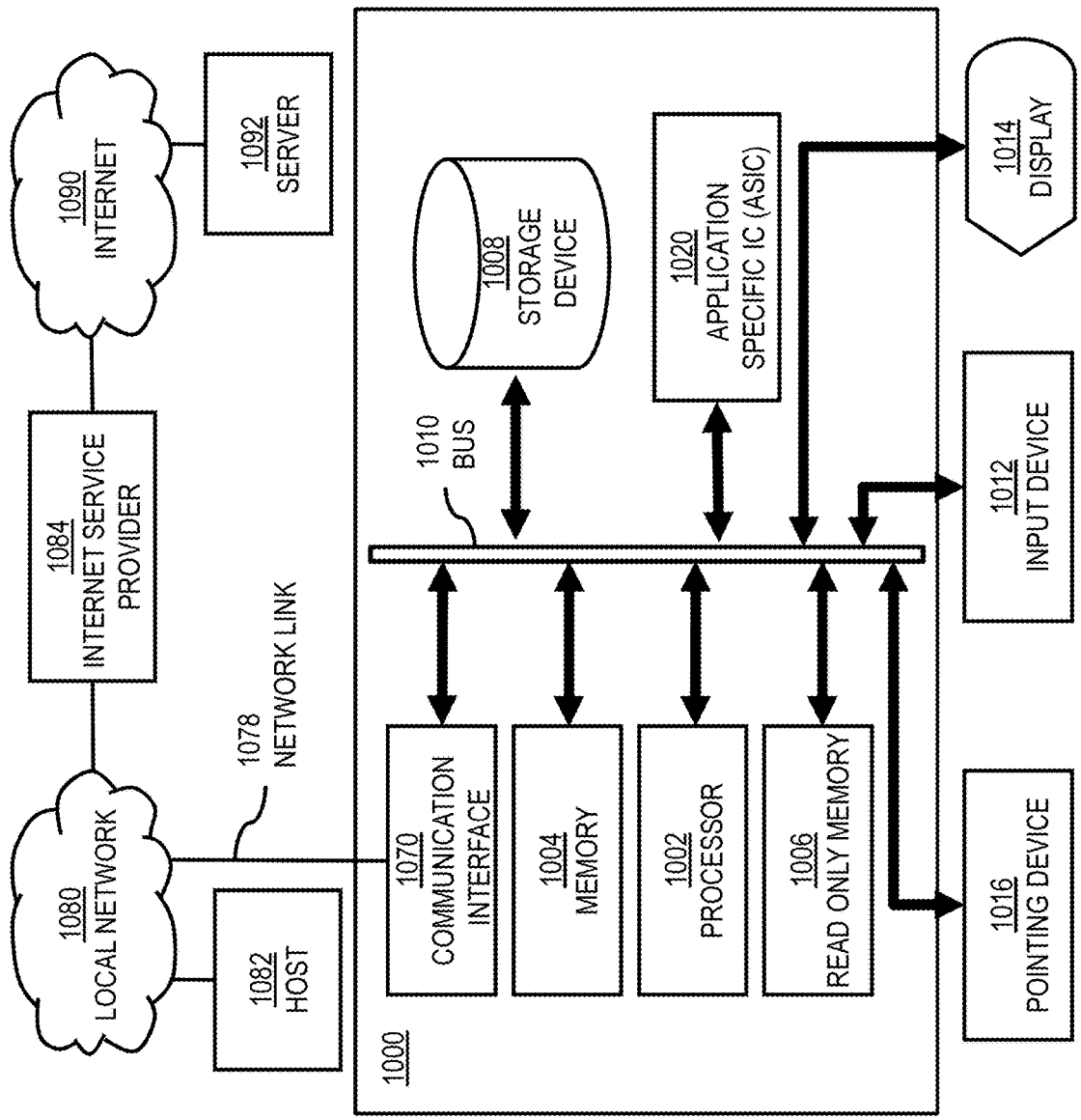
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide synthetic ground truth drive and sensor observation data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing synthetic ground truth drive and sensor observation data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations includes bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing synthetic ground truth drive and sensor observation data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing synthetic ground truth drive and sensor observation data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 123 for providing synthetic ground truth drive and sensor observation data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of the system can be deployed in various configurations within other computer systems, e.g., host 1082 and server 1092.

FIG. 11 illustrates a chip set 1100 upon which an embodiment of the invention may be implemented. Chip set 1100 is programmed to provide synthetic ground truth drive and sensor observation data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide synthetic ground truth drive and sensor observation data. The memory 1105 also stores the data associated with or generated by the execution of the inventive steps.

Figure 12:
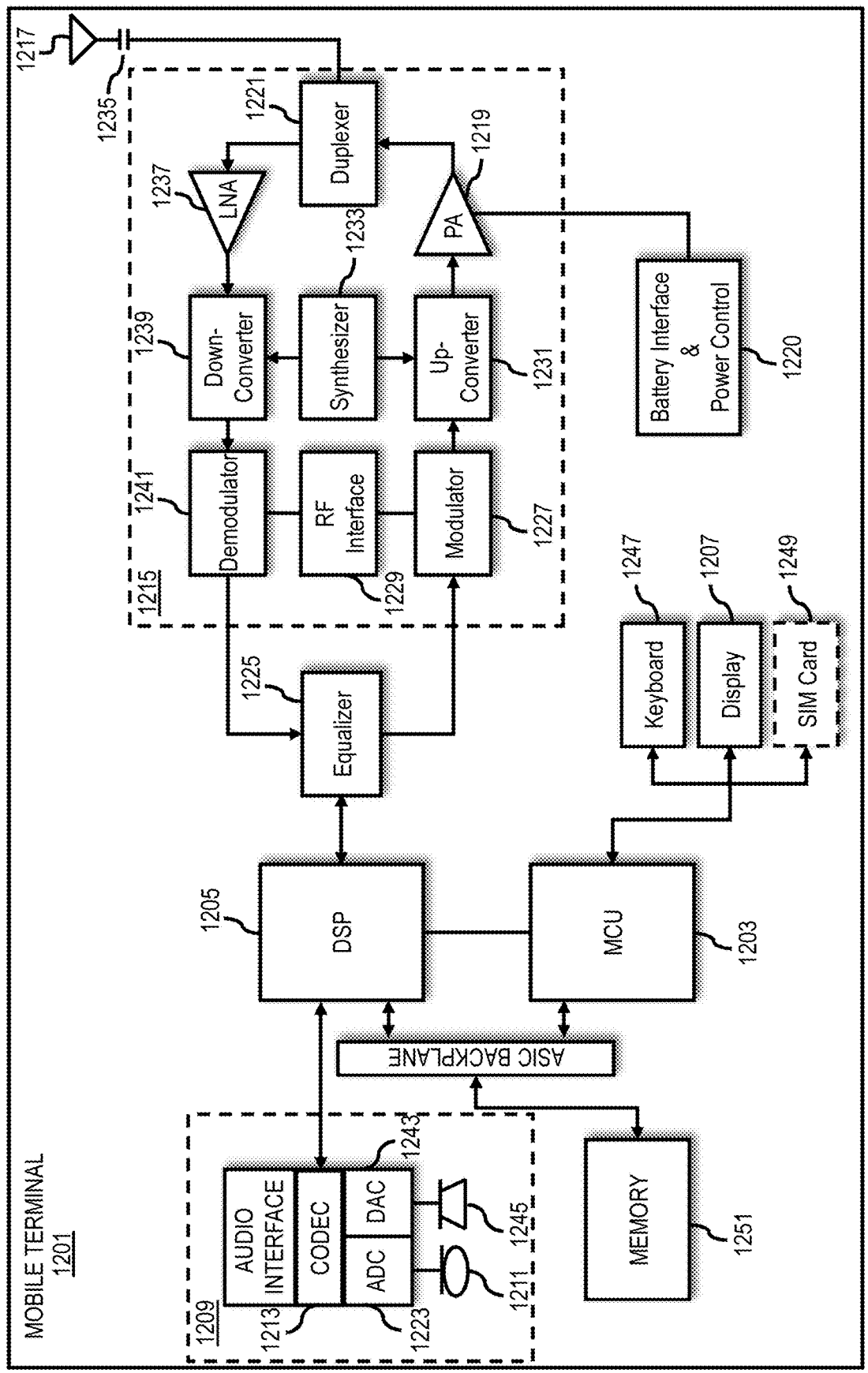
FIG. 12 is a diagram of a mobile terminal that can be used to implement an embodiment of the invention.

FIG. 12 is a diagram of exemplary components of a mobile terminal (e.g., UE 107, vehicle 101, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide synthetic ground truth drive and sensor observation data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, by a processor, a first input specifying ground truth data indicating one or more ground truth locations of one or more map features;
   receiving a second input specifying one or more simulation characteristics;
   generating simulated drive data based on the ground truth data and the one or more simulation characteristics, wherein the simulated drive data includes (a) one or more simulated drive paths within a region of interest encompassing the one or more ground truth locations and (b) one or more simulated sensor observations of the one or more map features; wherein the simulated drive data is generated using a generative adversarial network (GAN); and wherein the GAN is trained on real-world driving data for a generator network of the GAN to learn to generate synthetic drive paths that a discriminator network of the GAN cannot distinguish from real-world drive paths;

providing the simulated drive data to an automated map creation system to generate an estimated map; and comparing the estimated map to the ground truth data to determine a performance level of the automated map creation system.

2. The method of claim 1, further comprising:

improving a training of one or more feature detectors of the automated map creation system based on the performance level.

3. The method of claim 1, wherein the ground truth data further includes one or more attributes of the one or more map features.

4. The method of claim 3, wherein the one or more attributes include dimensions, a color, a type, or a combination thereof.

5. The method of claim 1, wherein the simulated drive path is generated based on one or more drivable surfaces determined from map data of the region of interest.

6. The method of claim 1, wherein the simulated drive path comprises a plurality of timestamped vehicle poses sampled at designated rate over an automatically determined trajectory over a road network in the region of interest.

7. The method of claim 1, wherein the one or more simulation characteristics include one or more statistical characteristics based on a positioning accuracy, a feature detection accuracy, or a combination thereof.

8. The method of claim 1, wherein the one or more simulation characteristics include a number of turns, a vehicle speed, a traffic density, a weather parameter, or a combination thereof on the one or more simulated drive paths.

9. The method of claim 1, wherein at least one simulated drive path of the one or more simulated drive paths is labeled as a true drive path based on a road network in the area of interest.

10. The method of claim 1, wherein the one or more simulated sensor observations are based on odometry, and wherein the odometry indicates a relative vehicle pose displacement from one timestamp to a next timestamp.

11. The method of claim 1, wherein the one or more simulated sensor observations are based on an absolute vehicle position determined at a timestamp.

12. The method of claim 1, wherein the one or more simulated observations includes a location measurement of the one or more map features, a measurement of one or more attributes of the one or more map features, or a combination thereof.

13. The method of claim 1, wherein the one or more simulation characteristics include a false positive rate, a false negative rate, or a combination thereof; and wherein the one or more simulated sensor observations are generated based on the false positive rate, the false negative rate, or a combination thereof.

14. The method of claim 1, further comprising:

applying at least one random perturbation to the one or more simulated drive paths, the one or more simulated sensor observations, or a combination thereof.

15. An apparatus comprising:

at least one processor; and at least one memory including computer program code for one or more programs, the at least one memory and the computer program code configured to, with the at least one processor, cause the apparatus to perform at least the following, receive a first input specifying ground truth data indicating one or more ground truth locations of one or more map features;

receive a second input specifying one or more simulation characteristics;

generate simulated drive data based on the ground truth data and the one or more simulation characteristics, wherein the simulated drive data includes (a) one or more simulated drive paths within a region of interest encompassing the one or more ground truth locations and (b) one or more simulated sensor observations of the one or more map features; wherein the simulated drive data is generated using a generative adversarial network (GAN); and wherein the GAN is trained on real-world driving data for a generator network of the GAN to learn to generate synthetic drive paths that a discriminator network of the GAN cannot distinguish from real-world drive paths; and provide the simulated drive data to an automated map creation system to generate an estimated map; and compare the estimated map to the ground truth data to determine a performance level of the automated map creation system.

16. The apparatus of claim 15, wherein the apparatus if further caused to:

improve a training of one or more feature detectors of the automated map creation system based on the performance level.

17. The apparatus of claim 15, wherein the ground truth data further includes one or more attributes of the one or more map features.

18. A non-transitory computer-readable storage medium, carrying one or more sequences of one or more instructions which, when executed by one or more processors, cause an apparatus to perform:

receiving a first input specifying ground truth data indicating one or more ground truth locations of one or more map features;

receiving a second input specifying one or more simulation characteristics;

generating simulated drive data based on the ground truth data and the one or more simulation characteristics, wherein the simulated drive data includes (a) one or more simulated drive paths within a region of interest encompassing the one or more ground truth locations and (b) one or more simulated sensor observations of the one or more map features; wherein the simulated drive data is generated using a generative adversarial network (GAN); and wherein the GAN is trained on real-world driving data for a generator network of the GAN to learn to generate synthetic drive paths that a discriminator network of the GAN cannot distinguish from real-world drive paths;

providing the simulated drive data to an automated map creation system to generate an estimated map; and comparing the estimated map to the ground truth data to determine a performance level of the automated map creation system.

19. The non-transitory computer-readable storage medium of claim 18, wherein the apparatus is caused to further perform:

improving a training of one or more feature detectors of the automated map creation system based on the performance level.

20. The non-transitory computer-readable storage medium of claim 18, wherein the ground truth data further includes one or more attributes of the one or more map features.

* * * * *